CABINET FOR ELECTRICAL COMPONENTS AND THE LIKE

Filed Oct. 9, 1959 3 Sheets-Sheet 1

INVENTORS
BERNARD CAMINKER
JAMES M. POWELL
BY Fulwider Mattingly & Huntley
Attorneys INVENTORS
BERNARD CAMINKER
JAMES M. POWELL
BY Zulwider Mattingly & Huntley
Attorneys

CABINET FOR ELECTRICAL COMPONENTS AND THE LIKE

Filed Oct. 9, 1959 3 Sheets-Sheet 3

INVENTORS
BERNARD CAMINKER
JAMES M. POWELL
BY Fulwider Mattingly & Huntley
Attorneys 3,056,639

CABINET FOR ELECTRICAL COMPONENTS AND THE LIKE

Bernard Caminker, 2909 Veteran Ave., Los Angeles 64, Calif., and James M. Powell, 2130 W. Ronneya Drive, Anaheim, Calif.

Filed Oct. 9, 1959, Ser. No. 845,371
7 Claims. (Cl. 312—108)

This invention relates generally to cabinets, such as are used for enclosing electrical components. More particularly, this invention is incorporated in a cabinet of the above type which may be shipped in the "knocked down" condition and easily assembled at the point of use.

This invention also relates to electrical component cabinets which may be made in a variety of sizes and external appearances without excessive costs because they all incorporate the same basic frame structure.

The electronic components which make up electronic systems, such as computer and transmission equipment, are usually housed in sheet metal cabinets. Such cabinets serve multiple functions, including that of protecting the enclosed delicate instruments, such as vacuum tubes, from accidental damage. Further, many times the cabinets form part of a cooling system for conducting forced air around the instruments within the cabinet.

Low priced cabinets of the type described, which have been available prior to this invention, are usually constructed of formed sheet metal components welded together at the manufacturer's plant and shipped fully assembled to the manufacturer of the components to be housed. At this stage, the electrical component manufacturer may mount the components in the cabinet and test them therein. Thereafter, the entire assembly may be shipped as a unit to the ultimate user. Alternatively, the electronic units may be demounted and shipped to the purchaser-user in separate containers in order to prevent damage in transit. If the latter procedure is used, the personnel of the system manufacturer must re-assemble the system in the cabinet at the point of use. In either case, it can be seen that the cabinet is shipped empty at least once and often twice. Since shipping space costs money, it is cheaper to ship the cabinet in the "knocked down" condition with major components of the cabinet taken apart and nested together.

A cabinet incorporating the present invention is of relatively low cost to the purchaser-user because the major components of the cabinet are bolted together and may be taken apart for shipment. The present cabinet has the additional salient advantage that the various components of the basic frame may be initially interlocked without bolts so that one man may assemble first the frame by himself and then bolt the frame together. Because of this, the cost of assembling the cabinet at the point of use is relatively low and usually outweighed by the savings in shipping cost.

It is important that electrical component cabinets be available in a wide variety of sizes to handle various different electronic systems and arrangements of components.

The electronics industry has set up standards that require that the opening of each bay in which the components are mounted be of a certain width. It is true that the height of the bays may be modified somewhat. However, the main variable in cabinet size is the number of bays used, which may be from one, to as many as are needed to house the system. The novel manner in which cabinets incorporating the present invention are constructed enables the manufacturer to produce single or multiple bay cabinets with a minimum change in the basic frame construction.

Another important characteristic of the cabinets made in accordance with the present invention is that the outward appearance, as well as the size, may be customized without greatly increasing the cost of such cabinets over the simplest cabinets of the prior art. This characteristic has recently become important because electronic systems are being used more and more in business offices, where it is desired that the cabinet add to rather than detract from the decor of the office. Along this line, in many instances, it is desired that the outward appearance of the cabinet be distinctive as compared to installations of different users. That is, many purchasers-users of systems want the system they purchase to be housed in a "customized" cabinet which is somewhat unique as compared to that of competitors. Further, many system producers desire to sell their system in cabinets which have an outward appearance which is distinctive with them. Thereby, they are able to create customer association of a particular style cabinet with a particular name.

Cabinets incorporating the present invention meet the above desiderata without excessive cost because the basic mechanical design allows the outward appearance to be greatly varied with a minimum of change in structure. Cabinets of the class described which have been available to date are not susceptible to such low cost customizing due to their construction.

Bearing in mind the problems of the prior art, some of which have been pointed out above, and the advantages of cabinets incorporating the present invention, it is a major object of this invention to provide a cabinet structure comprising certain fundamental components which are adapted to be assembled in various combinations and arrangements to provide many different shapes and appearances.

It is a further object of this invention to provide an electronic component cabinet which may be produced in a wide variety of sizes and appearances at a low cost.

Another object of this invention is to provide an electronic component cabinet having a structure which has a pleasing outward appearance without excessive manufacturing costs.

It is still a further object of this invention to provide electrical component cabinets which may be shipped to the point of use in a "knocked down" condition and there assembled easily by one man.

It is important that instruments located on the front of the cabinet to indicate information produced by the electronic system within the cabinet attract the eye of the user. Therefore, it is a further object of this invention to provide an electronic component cabinet wherein instruments mounted on the front of the cabinet are more prominent than the basic frame of the cabinet.

Other and further objects of this invention will become apparent in the detailed discussion below in conjunction with the attached drawings, wherein:

FIGURE 1 is a perspective view of the front of one presently preferred form of a cabinet incorporating the present invention;

FIGURE 1*a* is a partial perspective view of the rear of the cabinet shown in FIGURE 1;

Figures 1, 1A, 3, 4:
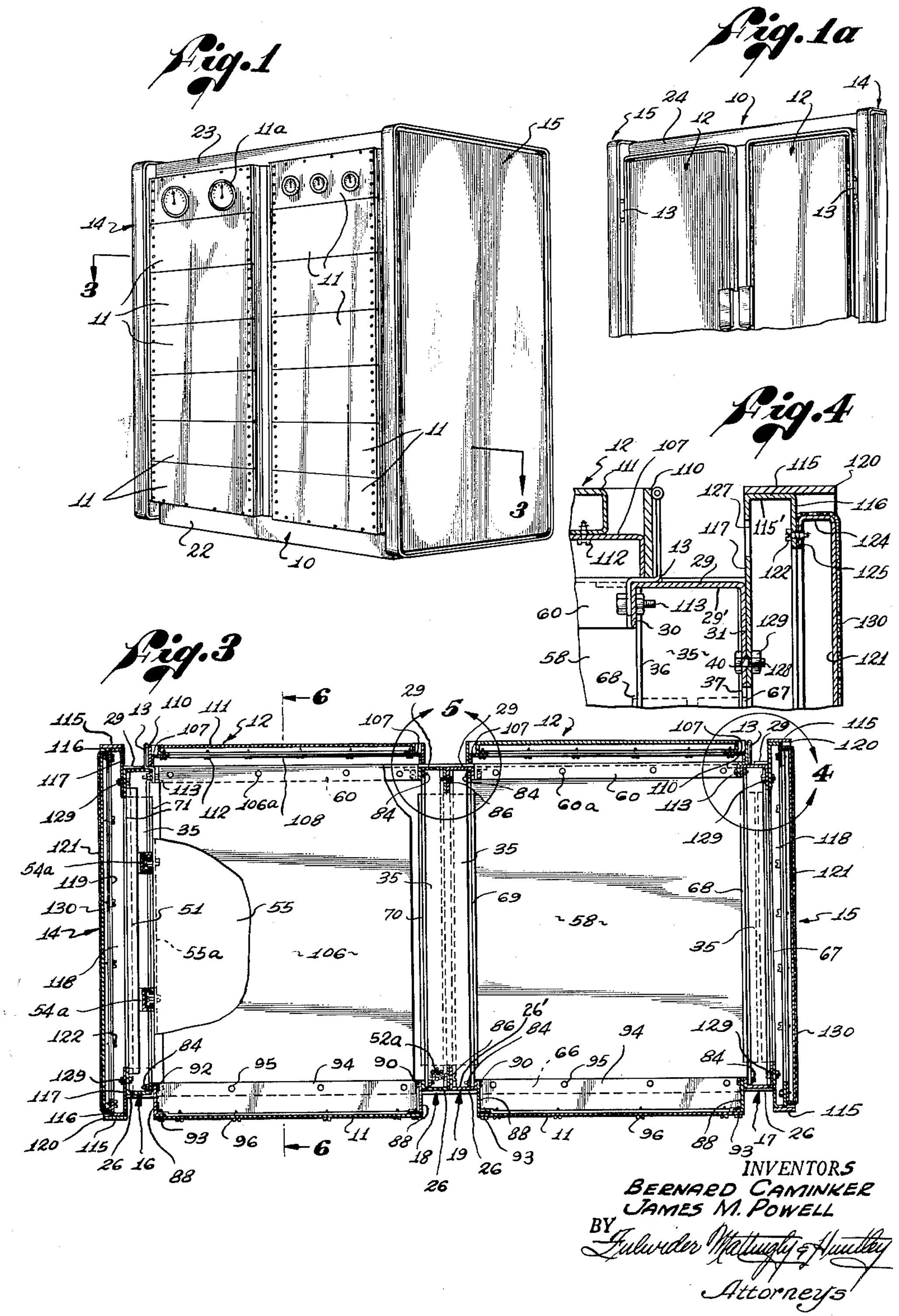
FIGURE 3 is a cross sectional plan view of the lower part of the cabinet shown in FIGURE 1 taken along the line 3—3 in that figure.
FIGURE 4 is an enlarged partial cross sectional view of the lower corner of the cabinet referred to by curved arrow 4 in FIGURE 3.

Referring first to FIGURES 1 and 1*a*, these drawings show front and rear perspective views of a preferred form of cabinets incorporating the present invention. In these figures, it may be seen that the cabinet has a basic frame 10 with a series of instrument panels 11 mounted on the front thereof. The instrument panels 11 may or may not have instruments **11*a*** mounted thereon according to the needs of the particular electronic system enclosed within the cabinet.

At the rear of the cabinet is located a pair of doors 12, each of which is mounted to the frame 10 by a pair of hinges 13. The lower portions of the doors 12 are substantially the same as the upper portions shown in FIGURE 1*a* and, therefore, the lower portion of the cabinet in FIGURE 1*a* is not shown.

The exterior enclosure of the cabinet is completed by a left side or end assembly 14 and a right side or end assembly 15 which are mounted to the left and right sides of the cabinet, respectively.

A two bay cabinet is shown to illustrate the invention. However, this is merely because many of our orders are for two bay cabinets and such a cabinet shows the invention well.

For convenience and uniformity in the following description, the term "longitudinal" will be used to refer to the horizontal direction which is generally parallel to the front and rear sides of the cabinet, and the term "transverse" will be used in describing members which extend generally at right angles to the "longitudinal" members, i.e., in a direction from rear to front or vice versa. These terms are used because, normally, cabinets incorporating the present invention are multiple bay cabinets which are substantially wider than they are deep.

Figures 2, 5:
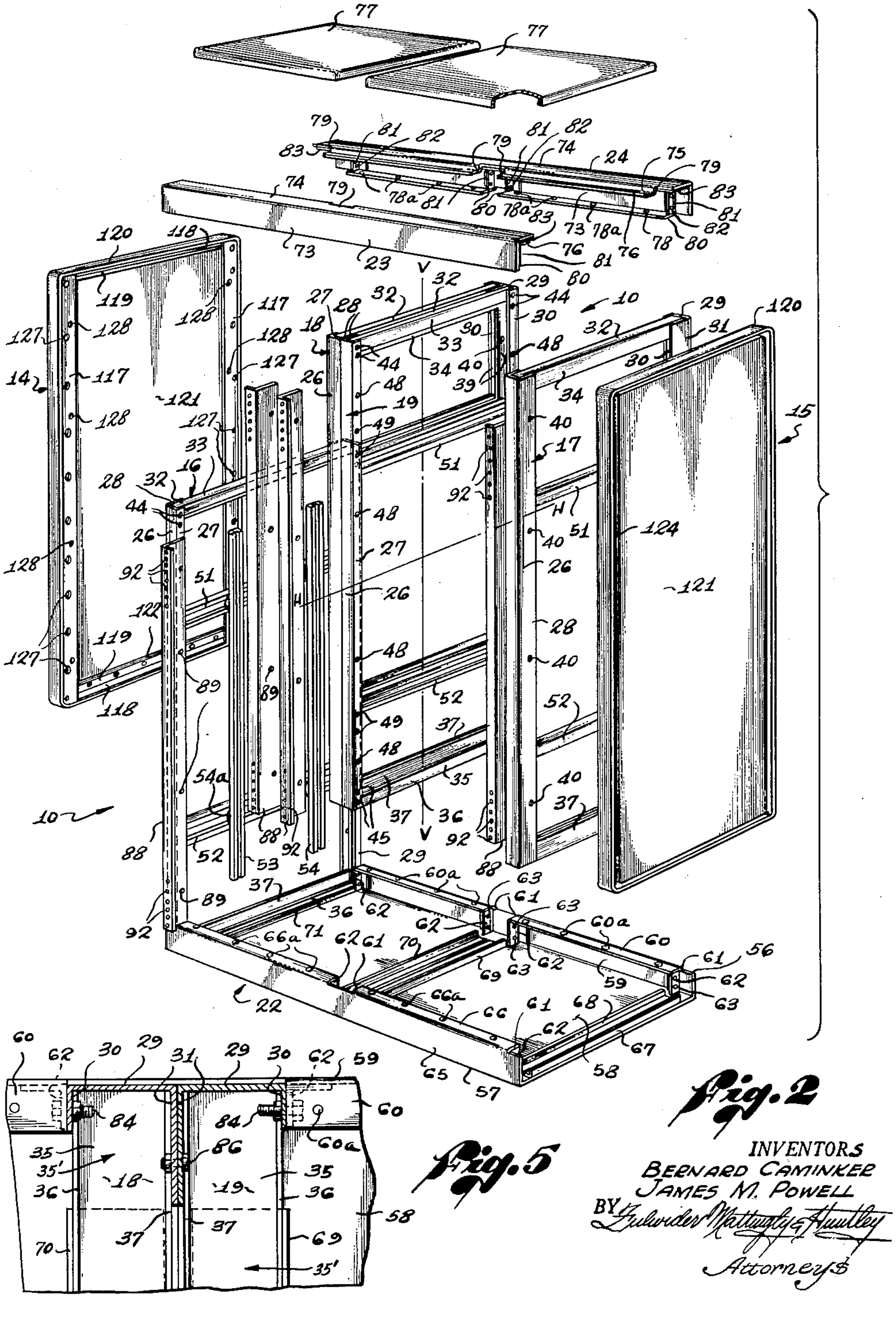
FIGURE 2 is an exploded view of the basic frame of the cabinet shown in FIGURE 1.
FIGURE 5 is an enlarged fragmentary cross sectional view of the portion of FIGURE 3 indicated by the arrow 5 therein.

Referring now to FIGURES 2 through 7, the basic frame 10 and its components will be discussed. FIGURE 2 shows the best overall view of the components of the frame 10. Here it may be seen that a left side standard 16 is located at the left side or end of the cabinet and a right side standard 17 is located at the right side of the cabinet. Because this is a two bay cabinet, a pair of intermediate vertical standards 18 and 19 are located midway between the ends of the cabinet. The lower ends of the standards 16 through 19 are held in their proper orientation by a base member 22. The upper ends of the standards 16 through 19 are held in their proper orientation by front and rear longitudinal top rails 23 and 24, respectively, which are secured thereto in a manner which will be described in more detail below.

The standards 16 through 19 are substantially identical and the coresponding parts of each have been given the same reference number. A detail description of one of the standards 16 through 19 will, therefore, suffice for all.

Each of the standards comprises a generally rectangular frame. Forming the front side of each frame, is a front vertical channel member 26 which has a narrow flange or side wall 27 and a wide flange or side wall 28 extending rearwardly from the channel web 26' toward a rear vertical channel member 29 which forms the rear side of the frame. Similar to the front channel member 26, the rear channel member 29 has a narrow flange or side wall 30 and a wide flange or side wall 31 which extends transversely from the channel web 29' inward toward the center of the cabinet.

Extending between the tops of the front and rear vertical channel members 26 and 29 is a horizontal channel member 32 (FIG. 7) having a narrow flange or side wall 33 and a wide flange or side wall 34, each extending downwardly, i.e., inwardly toward the interior of the cabinet from the channel web 32'. As can be seen, the flanges 33 and 34 of horizontal channel member 32 engage, respectively, the opposed surfaces of the flanges 30 and 31 of the front and rear channel members 26 and 29, respectively, at which points they are attached by suitable means, such as welding.

Located at the bottom of the standard 19 (FIGS. 2 and 5) is a bottom horizontal channel member 35 having a narrow flange or side wall 36 and a wide flange or side wall 37 extending upwardly from channel web 35'. Similar to channel member 32, the flanges 36 and 37 are, respectively, secured to the flanges 30 and 31 of the front channel member 26 and the rear channel member 29 by suitable means, such as welding.

As can best be seen on the front channel member 26 of standard 17 (FIGURE 2), a series of holes 40 are drilled in the wide flange 28 of the front channel member and a similar series of holes are formed in the wide flange 31 of the rear vertical channel member 29. The holes 40 are provided to receive fasteners to attach a side assembly thereto or to secure two contiguous standards, e.g., standards 18 and 19, together, as will be pointed out in more detail below.

The narrow flanges 27 and 30 of the front and rear vertical channel members 26 and 29, respectively, have two attachment holes 44 at the upper ends thereof to receive fasteners by which each standard may be secured to the top rails 23 and 24.

In order to attach the base member 22 to the standards, a pair of attachment holes 45 are formed in the narrow flanges 27 and 30 at their lower ends.

The narrow flanges 27 and 30 of channels 26 and 29, respectively, are each provided with a series of holes 48 used to attach mounting flanges to the standard by which the instrument panels 11 may be mounted in the front of the cabinet. Similarly, each of these narrow flanges 27 and 30 is provided with pairs of holes 49 near the upper and lower ends thereof to receive fasteners by which the hinges 13 of the doors 12 may be secured to the frame of the cabinet.

The exact location of the holes 44, 45, 48, and 49 is not extremely important; however, it is desirable that the holes be symmetrical around a horizontal line passing through the mid point of the vertical channel members 26 and 29, such as represented by the line H—H through standard 19. With this arrangement, the standard 19 (and each of the other standards) is symmetrical around both the horizontal axis represented by a line H—H (FIG. 2) and the vertical axis represented by the line V—V and it does not matter whether the channel 35 or the channel 32 is topmost. Further, with the holes formed in the narrow flanges of both the vertical channel members 26 and 29, as described, instrument panels may be mounted on the front or rear of the cabinet or both. Similarly, doors may be mounted on the front or rear of the cabinet or both.

Each of the standards 16 to 19 also has an upper horizontal mounting bar 51 and a lower horizontal mounting bar 52 secured to the wide flanges 28 and 31 of the vertical channel members 26 and 29 by means such as welding. As can best be seen in FIGURE 6, the horizontal mounting bars 51 and bar 52 do not extend all the way to the respective webs of the vertical channel members 26 and 29. This is done in order to provide a passageway within the vertical channel members 26 and 29 along which electrical conductor cables, such as wire bundle 52*a* (see channel member 26 of standard 18 in FIGURE 3) in the electronic system may pass vertically from one level of the cabinet to another. With this arrangement, the wire bundles are out of the way and not subject to scuffing when the various electrical components are removed for repair.

In the preferred embodiment of the invention shown, the mounting bars 51 and 52 are manufactured out of the material sold under the tradename "Unistrut" which is described in the Patent Nos. 2,329,815 and 2,345,650. Although other shaped members could be used, the "Unistrut" structure has the advantage that various bracket and accessory components are readily available commercially to provide a wide variety of means to mount the electronic system components to the cabinet. As shown on standard 16 (FIGS. 3 and 6) a pair of vertically extending Unistrut channels 53 and 54 are mounted on the horizontal Unistrut channels 51 and 52, in order to mount various system components at different levels in the cabinet. It will be noted that the vertical channels 53 and 54 are attached in spaced relation with respect to channels 51 and 52 by a series of spacers 54*a*, the thickness of which may be varied in order to compensate for any variations in the width of the components mounted within the particular bay. Normally, vertically extending Unistrut channels similar to 53 and 54 will be provided on each of the standards 17, 18, and 19, but, in order to simplify the drawing, they are not shown since they would look substantially the same as the vertical channels 53 and 54 mounted on the standard 16.

Figure 6:
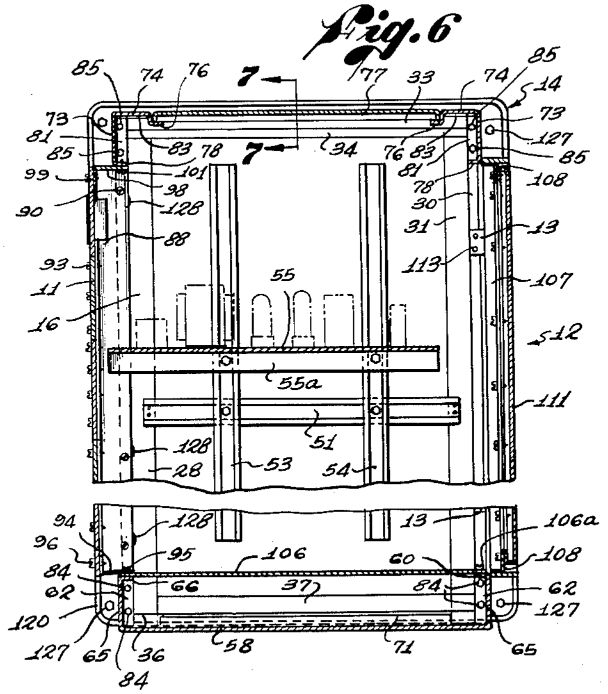
FIGURE 6 is a vertical cross sectional view of the left end of the cabinet taken along line 6—6 in FIGURE 3.

As can best be seen in FIGURES 3 and 6, a shelf 55 is shown mounted in the left bay of the cabinet for illustrative purposes and carries electrical components shown in phantom lines. The shelf 55 has a downwardly extending flange 55*a* along each side thereof. Bolts may be passed through holes in the respective side flanges and threaded into nuts within the vertical Unistrut channels 53 and 54 in a manner described in the above mentioned patents.

The bottoms of the standards 16 to 19 are held in spaced parallel relation by the base member 22 in the preferred embodiment. The best overall view of the base member 22 is believed to be shown at the lower portion of FIGURE 2. Here it may be seen that the base member 22 includes a rear longitudinal rail 56 and a front longitudinal rail 57 extending along the rear and front edges of a horizontal plate 58. The rear longitudinal rail 56 has a longitudinal vertical wall 59 which extends upwardly from the rear edge of the plate 58. Extending inwardly from the upper edge of wall 59 is a longitudinal horizontal flange 60 which has a series of mounting holes 60*a*.

In order to receive and hold the various standards in proper relation while the basic frame is being assembled, notch means are provided in the inner side of the longitudinal vertical wall 59. The notch means takes the form of a series of notched out portions 61 in the longitudinal horizontal flange 60 cooperating with a transverse vertical flange 62 extending down from each edge of each notched out portion 61, the flanges being secured to the vertical longitudinal wall 59 at those points. In the preferred embodiment, each of the transverse vertical flanges 62 takes the form of an angle bracket secured to the wall 59 by suitable means, such as spot welding. As can be seen, each of the flanges 62 has two holes 63 formed therein. The holes 63 are located so that when a standard is located in the notch, the holes are aligned with the attachment holes 45 in the flange 30 of vertical channel member 29 and bolts may be passed therethrough to rigidly attach the standard to the base member.

The front rail 57 is substantially the same as the rear rail 56 and has a longitudinal vertical wall 65 with a longitudinal horizontal flange 66 along the upper edge thereof. Mounting holes 66*a* are formed in the flange 66. As in the case of the rail 56, notched out portions 61 in flange 66 and transverse vertical flanges 62 form notch means on the inside of the longitudinal vertical wall 65 to receive and hold the forward ends of the bottoms of the various standards. Also similar to the notch means on the rear longitudinal rail 56 the holes 63 in the flanges 62 on the front wall 65 may be aligned with the attachment holes 45 on the front channel members 26.

In order to aid further in holding the standard 17 in the upright position while the top rails 23 and 24 are placed thereon, transverse vertical flanges are provided extending upwardly from the plate 58. In this embodiment, the flanges take the form of a pair of right side transverse right angle members 67 and 68 which are spot welded to the horizontal plate 58. It has been found that as a practical matter the upward flange of member 67 which extends upwardly from the edge of the right side of base member 22 will cooperate with the cut out portions 61 in the horizontal flanges 60 and 66 sufficiently to hold the standard 17 while the top rails 23 and 24 are located on the assembly. However, in some cases it is desirable to use a second flange, such as produced by the member 68.

In order to aid in holding the intermediate standards 18 and 19 in the proper orientation while the top rails 23 and 24 are located in position, a pair of transverse upwardly extending flanges, produced by right angle members 69 and 70, extend between the transverse vertical flanges 62 on the vertical walls 59 and 65, respectively. At the left side of the horizontal plate 58 are located a pair of right angle members 71 substantially the same as 67 and 68 which cooperate to maintain standard 16 in proper orientation while top rails 23 and 24 are located thereon.

Further details of the manner in which the standards 16 to 19 are mounted to the base member 22, will be described below. Referring now to the upper portion of FIGURE 2, the details of the presently preferred structure of top rails 23 and 24 will be discussed. Since both of the top rails 23 and 24 are the same, they will be described in detail together and the same numbers will be used to identify the various portions of each.

The top rails 23 and 24 each have a longitudinal vertical wall 73 with a longitudinal horizontal flange 74 extending transversely inwardly from the upper edge thereof. Each of the upper flanges 74 has an inwardly jogged edge portion 75 forming a recessed horizontal surface 76.

As seen best in FIGURE 6, the recessed surfaces 76 are provided to support the front and rear edges of a top panel 77 on each of the bays. The panels 77 may take various forms according to the particular application. For example, in addition to the particular form shown, they can be made of expanded metal in order to allow cooling air to pass upwardly and out therethrough. The top members 77 can also be formed of some decorative material to add to the overall attractiveness of the cabinet.

Referring again to the details of the structure of the top rails 23 and 24, it is seen that a lower longitudinal horizontal flange 78 extends inwardly from the lower edge of each of the longitudinal vertical walls 73. The flanges 78 are the counterparts of the flanges 60 and 66 of the base member 22 and accordingly have mounting holes 78*a* therethrough. Notch portions are formed on the inner side of each of the longitudinal vertical walls 73 in order that the top rails 23 and 24 may be placed over the standards and orient the upper ends of the standards. For this purpose, the upper flanges 74 are notched out as indicated at 79, and the lower flanges 78 are notched out as indicated at 80. Similar to the flanges 62 at the edge of the notched portions 61 on base member 22, transverse vertical flanges 81 are mounted to the inside of each of the top rails 23 and 24 at the edges of the cut away portions 80. The vertical flanges 81 have holes 82 formed therein to align with the holes 44 on the various standards in order to attach the top rail to the respective upper corners of the standards.

Located on the bottom of the longitudinal horizontal flange 74 at each of the notched out portions is a spacer pad 83 which contacts the upper end of the particular standard which is inserted into the particular notch. The purpose of the spacer pads 83 on the top rails 23 and 24 is to compensate for the extra thickness of the transverse members 67 through 71 on the base member 22. Thus, the base member 22 and top rails 23 and 24 may be interchanged where desired without disturbing the vertical position of the standards 16 through 19.

From the foregoing description it will be seen that the present basic frame may be easily assembled by one man. In the usual assembly procedure, the base member 22 is laid on the floor and each of the standards 16 through 19 dropped into the notch means on the base member 22. Due to the construction of the notch means, each of the standards will be held in its upright position while the other standards are being located in the other notch means on the base member 22 and while the top rails 23 and 24 are being located on the respective top corners of the standards.

With the standards and rails in place, bolts 84 and 85 may then be inserted through the standards and the various transverse vertical flanges 62 and 81 at the notch means to attach the standards rigidly to the base member 22 and to the top rails 23 and 24. Bolts 86 are located through the holes 40 in the vertical channel members 26 and 29 of the intermediate standards 18 and 19 to attach these standards together.

The present invention not only permits a wide variety of sizes of cabinets to be produced from standard components but also enables us to produce many different variations of the outward appearance of the cabinet without greatly increasing the production cost. First of all, the instrument panels 11 may be mounted in a position where they project forward from the basic frame, or they may be flush with the basic frame, or recessed into the basic frame, as desired by the purchaser-user. Any such arrangement may be had without any changes to the basic frame structure. This is accomplished by mounting the instrument panels 11 on a mounting flange 88 located at either side of each bay. The mounting flanges 88 each have a series of holes 89 at intervals so that the holes 89 may be aligned with the holes 48 on the narrow flange 27 of the vertical channel member 26. With this arrangement, the mounting flanges 88 may be attached to the respective standards by a series of sheet metal screws 90 extending through the holes 89 and 48. In order to mount the instrument panels 11 to the mounting flanges, a series of holes 92 are formed in the flanges as shown. The holes 92 are spaced along the mounting flanges 88 according to standards established in the electronics industry. More specifically, the spacing between the adjacent holes is ⅝″—⅝″—½″—⅝″—⅝″—½″ etc.

Extending along the lower edge of the bottom panels 11 at the front of each of the bays is a right angle member 94. The member 94 has a series of holes through the horizontal flange thereof which are coincident with the holes 66*a* in the flange 66 on the base member 22. With this arrangement, a plurality of sheet metal screws 95 may be used to mount the member 94 to the base member 22, as shown. Similarly, the vertical flange of the right angle member 94 has a plurality of holes formed therein in order to receive a series of sheet metal screws 96 which mount the lower edge of the lower instrument panel to the member 94.

At the top edge of the top instrument panel 11 is an upper longitudinal right angle member 98 which closes the space between the longitudinal wall 73 and the uppermost edge of the instrument panels. The member 98 is mounted to the instrument panel 11 by a series of sheet metal screws 99 which extend through the instrument panels and through holes in the downwardly extending flange 100 of the member 94.

Holes are also provided in the horizontal portion of the right angle member 98 at such positions that they are coincident with the holes 78*a* in the front top rail 23. With this arrangement, the member 98 is mounted to the flange 78 of the front top rail 23 by a series of sheet metal screws 101.

Figures 8, 10:
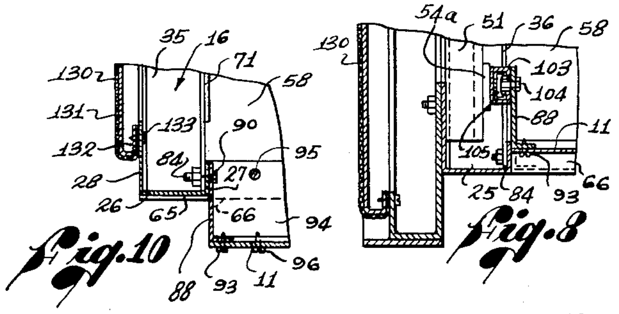
FIGURE 8 is a partial cross sectional view of the cabinet in FIGURE 1, illustrating how instrument panels may be mounted in a recessed position.
FIGURE 10 is an enlarged fragmentary cross sectional view taken along line 10—10 in FIGURE 9 and shows details of the construction of the side assembly illustrated in that figure.

A preferred manner in which the instrument panel 11 may be mounted flush to or recessed within the frame is shown in FIGURE 8. In this case, the mounting flange 88 is mounted to a vertically extending Unistrut channel 103 by means of a series of screws 104. The channel 103 is in turn attached to the horizontal mounting bar 51 as by a bolt 105 while the lower end of the channel 103 is similarly mounted to the mounting bar 52. The mounting flange 88 on the other side of the bay is mounted in the same manner as just described. With this arrangement, the vertical Unistrut channels 103 may be adjusted forwardly or rearwardly, as desired, and then the bolts 105 are tightened to hold the vertical channels 103 in the desired position.

Often it is desired to provide horizontal dividers inside the cabinet near the top or bottom thereof to form, for instance, plenum chambers through which cooling air may be passed. In cabinets incorporating our invention, the longitudinal horizontal flanges 60 and 66 on the base member 22 and the corresponding flanges 78 on the front and rear top rails 23 and 24 are very useful for mounting such dividers. To illustrate this, a horizontal plate 106 (shown in FIGURES 3 and 6) is mounted to the longitudinal horizontal flanges 60 and 66 by sheet metal screws 106*a* extending through the holes 60*a* in flange 60 and sheet metal screws 95 extending through the flange 66.

Referring now to FIGURES 3, 4, and 6, the details of the construction of the doors 12 will be described. Each of the doors 12 is made up of a generally rectangular frame comprising a pair of spaced vertical angles 107 and lower and upper horizontal angles 108. The angles 107 and 108 are welded together at their respective ends to form a rigid rectangular frame and are also welded to a rectangularly shaped peripheral strap 110 which is wrapped around the periphery of the frame. Extending across the frame 107 and 108 is a panel 111 which is secured to the frame by sheet metal screws 112 as shown. In order to mount the doors 12 to the cabinet, each door has hinges 13 on the strap 110 as shown best in FIGURE 4. FIGURE 4 also illustrates the manner in which the flap of each hinge 13 is mounted to the flange 30 of the rear vertical channel member 29. Bolts 113 extend through the hinge straps and the holes 49 in the channel member 29 for this purpose.

Turning now to the left and right side assemblies 14 and 15, they are substantially identical, and therefore, the same numbers will be used to designate the corresponding portions of each. Similar to the rear doors 12, each of the side assemblies has a generally rectangular side assembly frame with a panel secured thereto. In this embodiment, the side assembly frame comprises front and rear vertically extending channels 115, each having a narrow flange 116 and a wide flange 117 extending inwardly from the web 115′ thereof. Extending between the upper and the lower ends of the channels 115 are upper and lower horizontal angles 118, each of which has a transverse vertical flange 119 extending inwardly. The channel members 115 and angles 118 are welded together at their abutting ends to form a rigid side assembly frame. Wrapped around the outside of the side assembly frame is a peripheral strap 120 which is welded thereto. In actual practice it has been found expedient to form the strap 120 of two pieces which are joined together at the center of the top and the bottom edges of the side assembly.

Extending across the rectangular frame formed by the members 115 and 118 is a panel 121 secured thereto by sheet metal screws 122. The details of the panel 121 are illustrated best in FIGURES 4 and 7. It may be seen that the panel 121 has a spacing flange 124 around the periphery thereof with an inwardly extending mounting flange 125 thereon. The mounting flange 125 is generally parallel to and spaced from the major portion of the panel 121. It should also be noted that the edges of the panel 121 are spaced from the inside of the strap 120. As may be seen best in FIGURES 1, 1*a*, and 2 this inexpensive structure produces an attractive appearance with a shadow line between the panel 121 and the strap 120.

Referring back to the channel members 115, it is seen that a series of holes 127 are formed through the wide flanges 117 in order to allow a screw driver to be inserted to install the sheet metal screws 122 (see FIGURES 2 and 4). The side walls 117 also have a series of holes 128 which are spaced so that they may be aligned with the holes 40 in the flanges 28 and 31 of the vertical channel members 26 and 29 of the standards. With this arrangement, the side assemblies may be attached to the respective standards 16 and 17 by a series of bolts 129 extending through the holes 40 and 128.

One of the salient features of the end assemblies 14 and 15 is that numerous different appearances may be presented with the same basic structure. For instance, the panel 121 can be made of brushed metal rather than common sheet metal or a decorative covering material 130 may be applied on the exposed surfaces of the panel 121 with glue or cement. In the latter case, "Naugahyde" plastic materials of different colors and textures have been found to be especially suitable. With this arrangement, a wide variety of appearances may be produced for a particular desire of the purchaser-user. A decorative material similar to 130 may also be provided on the panels 111 on the doors 12 in order to add to the decor of the cabinet, if desired.

Figure 9:
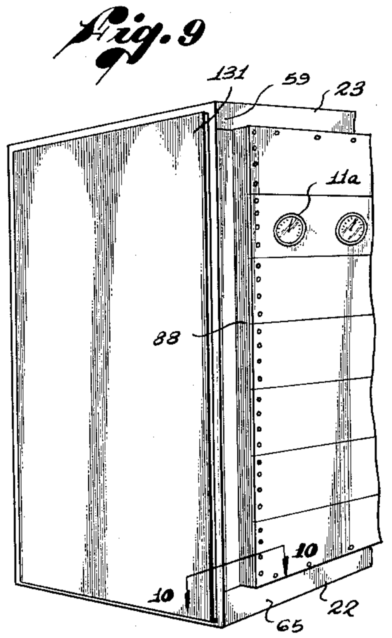
FIGURE 9 is a perspective view of an alternate form of side assembly which may be used with the basic frame of the cabinet, shown in FIGURE 1.

The appearance of the left and right side of the cabinet may also be varied by using "applied panel" side assemblies, such as the one shown in FIGURES 9 and 10. In this case, a panel 131 which is of the same general shape as the panels 121 is used. The panel 131 has inwardly extending mounting flanges 132 spaced from the main portion of the panel 131 in the same manner that the mounting flanges 125 are spaced from the main portion of each panel 121.

The panel 131 is attached to the standard 16 by sheet metal screws 133 which pass through the holes 40, which are in the wide flanges 28 and 31 of the vertical channels 26 and 29. A decorative material, such as the decorative material 130 applied on the panels 121 may also be applied over the exposed surfaces of panel 131 to present a wide variety of appearances.

Figure 11:
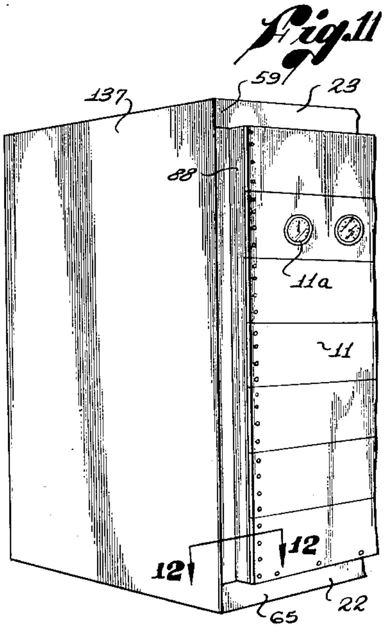
FIGURE 11 is a perspective view of a third form of side assembly which may be used with the basic frame of the cabinet shown in FIGURE 1.
Figures 7, 12:
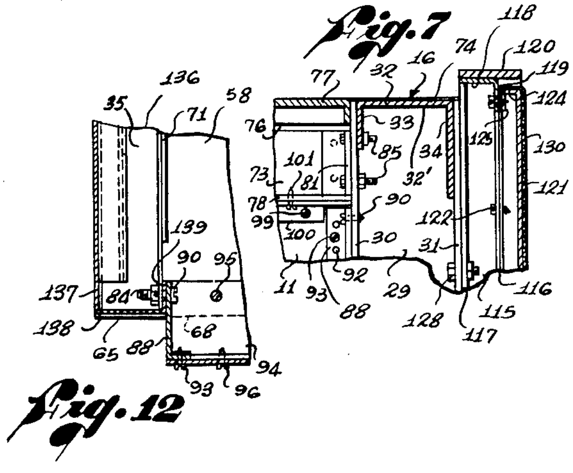
FIGURE 7 is an enlarged fragmentary cross sectional view taken along line 7—7 in FIGURE 6 and shows the details of the manner in which a top assembly is mounted to vertical standards.
FIGURE 12 is an enlarged fragmentary cross sectional view taken along line 12—12 in FIGURE 11, showing details of construction of the side assembly, illustrated in that figure.

The appearance of the cabinet may be further varied by using "wrap around" type standards to close the left and right sides of the cabinet. A "wrap around" type standard 136 is shown in FIGURES 11 and 12. The standard 136 uses a lower and upper channel substantially the same as channels 35 and 32, shown in FIGURE 2. Only the lower channel 35 is shown in FIGURE 12. Instead of front and rear vertical channels 26 and 29, respectively, the wrap around standard 136 uses a transverse vertical panel 137 having flanges 138 and 139 at the front and rear edges thereof. The flanges 138 are each of the same width as the webs of the channels 26 and 29. Further, each of the flanges 139, which extend inwardly from the flanges 138, has a series of attachment holes at the same locations as the holes 44, 45, 48, and 49 in the narrow flanges 27 and 30 of the vertical channel members 26 and 29.

As can be seen from the above discussion, we are able to provide cabinets of a wide variety of sizes and appearances, without the high cost of manufacture which normally attends "customized" cabinets. We are able to do this because of the particular manner in which the basic frame of the cabinet is made. More particularly, all of the standards 16 through 19 are exactly the same so that any two may be used for each bay of the cabinet. Further, the holes 44, 45, 48, and 49 are located in the above described places in all of the standards. With this arrangement, doors, such as 12, may be located on the front as well as on the rear of the cabinet; or instrument panels, such as 11, may be located on the rear as well as on the front of the cabinet without drilling any new holes or otherwise modifying each of the standards. Further, each of the standards may be attached to an adjacent standard or to a side assembly without any modification.

The particular manner in which the base member 22 and the front and rear top rails 23 and 24 are made, also helps to keep the costs to the purchaser-user down. This is because the structure of these elements allows them to be interchanged with each other and further, they may be manufactured for one or many bays easily.

Although only a few embodiments of the present invention have been shown and described in detail, it will be apparent to those skilled in the art that such is by way of illustration only and that numerous modifications may be made to the structure shown without departing from the spirit of the invention. Therefore, it is our intention that the scope of our invention should only be limited to the scope of the appended claims.

We claim:

1. A cabinet comprising: a first and a second standard spaced apart longitudinally of the cabinet, each of said standards including a rectangular frame extending transversely of the cabinet and comprising opposed horizontal and opposed vertical channel members secured together and forming corners of the standard at their meeting ends; a base and a top assembly each including a front and a rear longitudinally extending rail engaging the lower and upper front and rear corners of said standards, respectively, each of said rails having a vertical wall and a horizontal flange extending along the vertical and horizontal channel members of the standards from the respective corners; a plurality of pairs of spaced-apart members on each of said rails, each pair being located opposite a different respective corner of the standards, each of said pairs engaging one of the flanges of one of the two channel members which abut at the particular corner of the standard which the particular pair engages.

2. In a cabinet: a base assembly, a first and a second vertical standard extending transversely of the cabinet; said base assembly including a horizontal plate having front and rear vertical walls extending upwardly therefrom and extending longitudinally of the cabinet; a horizontal flange along the top of each of said vertical walls extending inward toward the other of said vertical walls, said flanges each being cut away at different portions; part of at least one standard being received in each of said cut away portions; a vertical attachment flange extending downward from each of said horizontal flanges and inward from said vertical wall at the edges of said cut away portions, the part of a given standard located in a given cut away portion being attached to the associated attachment flange; a vertical flange along a side edge of said plate, said last-mentioned flange extending upwardly and engaging the side of the standard which is opposite the side engaged by the associated attachment flange.

3. In a cabinet a first and second standard, each of said standards including a generally rectangular frame made of a pair of opposed, inwardly facing horizontal and a pair of opposed, inwardly facing vertical channel members, the flanges of said vertical channel members of each of said standards which are further away from the other standard being wider than the other of the flanges of these members; a first and a second generally horizontally extending mounting bar mounted to the wider flange of said vertical channel members of each of said standards; a base and a top assembly each including a front and a rear rail engaging the lower and upper front and rear corners of said standards, each of said rails having a vertical and a horizontal flange extending along the vertical and horizontal channel members of the standards at the associated corners, each of the rails having shoulder members extending inwardly from the respective vertical flanges engaging the narrower flange of a respective vertical channel member, said shoulder members holding the standards in proper orientation while the standards are mounted to the base and top assemblies.

4. In a cabinet as defined in claim 3 wherein a side assembly is attached to said first standard; said side assembly including: a frame formed of horizontally spaced front and rear and generally parallel vertical side assembly members and a lower end assembly member and an upper horizontal side assembly member secured, respectively, to the lower ends and the upper ends of said vertical side assembly members, each of said side assembly members having an inwardly extending flange thereon; a strap extending contiguously around the outside surface of said side assembly members; a panel extending between said horizontal and vertical side assembly members across the frame, the edges of said panel being spaced inwardly of said strap whereby a shadow line is formed between said panel and said strap.

5. A cabinet comprising: a rectilinear base including spaced, opposed front and rear rails; vertical walls on said base and defining a plurality of notches which open upwardly through said rails, said notches being located in opposed pairs and each having a substantial planar cross-section; a plurality of substantially identical vertical standards, the ends of each standard having a planar cross-section approximately equal to the planar cross-section of said notches whereby either end of a standard is insertable therein; and a rectilinear top including spaced, opposed front and rear top rails; vertical walls on said top and defining a plurality of notches which open downwardly through said top rails and in alignment, one each, with the base notches, each of said notches having a planar cross-section approximately equal to the planar cross-section of the base notch in alignment therewith; the otherwise exposed ends of said standards being inserted in said top-rail notches; and means securing the ends of the standards to the respective vertical, notch-defining walls.

6. A rectilinear cabinet structure comprising: a base having front and rear rails extending longitudinally of the structure, each of said rails having a horizontal flange extending from the upper edge of that rail inward toward the other of said rails; means on said base forming standard-receiving recesses extending transversely of the structure at each end of said rails and at an intermediate position, the recesses at said intermediate position including spaced notches in said flanges, vertical shoulders extending downwardly from the side-defining sides of the notches, and vertical flanges extending between correlative shoulders, each of the recess forming means at the ends of the rails including a vertical flange extending between the correlative end edges of said rails; a plurality of substantially identical vertical standards spaced apart longitudinally of the structure, each of said standards resting with its lower end snugly received in one of said recesses, whereby, during erection of the structure, the standards are maintainable in vertical positions without being secured to said base; means on each of said shoulders for attaching the lower ends of said standards to said shoulders; and a top connected to and holding the upper ends of said standards in predetermined spaced orientation.

7. A rectilinear cabinet comprising: adjacent first and second generally rectangular standards located intermediate the ends of said cabinet, each of said standards including a front and a rear vertical channel member, each channel member having a narrow flange, a wide flange, like flanges of front and rear channel members being in facing opposition, the wide flanges of adjacent standards being in contiguous relation, means connecting said contiguous flanges; third and fourth generally rectangular vertical side standards spaced longitudinally of the cabinet from opposite sides of said intermediate standards, each of said side standards having front and rear vertical channel members, each of said side standard channel members having its flanges extending transversely of the cabinet toward the opposite channel member of that standard; a panel connecting the outer flanges of said side standard channel members; a base having upwardly opening recesses defined therein, the lower ends of said standards being received within said recesses and supported in spaced relation by the defining walls of said recesses; and a top having downwardly opening recesses defined therein, the upper ends of said standards being received within said recesses and held in spaced relation by the defining walls of said recesses.

References Cited in the file of this patent

UNITED STATES PATENTS

| | | |
|---|---|---|
| 395,417 | Baskam | Jan. 1, 1889 |
| 1,194,532 | Meilink | Aug. 15, 1916 |
| 1,244,609 | Hood | Oct. 30, 1917 |
| 1,345,366 | Jippson | July 6, 1920 |
| 1,428,070 | Young | Sept. 5, 1922 |
| 1,772,814 | Laycock | Aug. 12, 1930 |
| 2,196,399 | Rubel | Apr. 9, 1940 |
| 2,496,453 | Hazen | Feb. 14, 1950 |
| 2,572,081 | Wallance | Oct. 23, 1951 |
| 2,620,252 | Restivo | Dec. 2, 1952 |
| 2,667,401 | Knuth | Jan. 26, 1954 |
| 2,912,294 | Wells | Nov. 10, 1959 |

FOREIGN PATENTS

| | | |
|---|---|---|
| 1,107,393 | France | Dec. 30, 1955 |
| 795,873 | Great Britain | June 4, 1958 |

UNITED STATES PATENT OFFICE

CERTIFICATE OF CORRECTION

Patent No. 3,056,639 October 2, 1962

Bernard Caminker et al.

It is hereby certified that error appears in the above numbered patent requiring correction and that the said Letters Patent should read as corrected below.

Column 10, line 71, after "cabinet" insert a colon; column 11, line 5, for "flange" read -- flanges --.

Signed and sealed this 23rd day of April 1963.

(SEAL)

Attest:

ERNEST W. SWIDER
Attesting Officer

DAVID L. LADD
Commissioner of Patents